(No Model.)
J. H. STEBBINS, Jr.
PROCESS OF TREATING BUTTER.
No. 505,137. Patented Sept. 19, 1893.
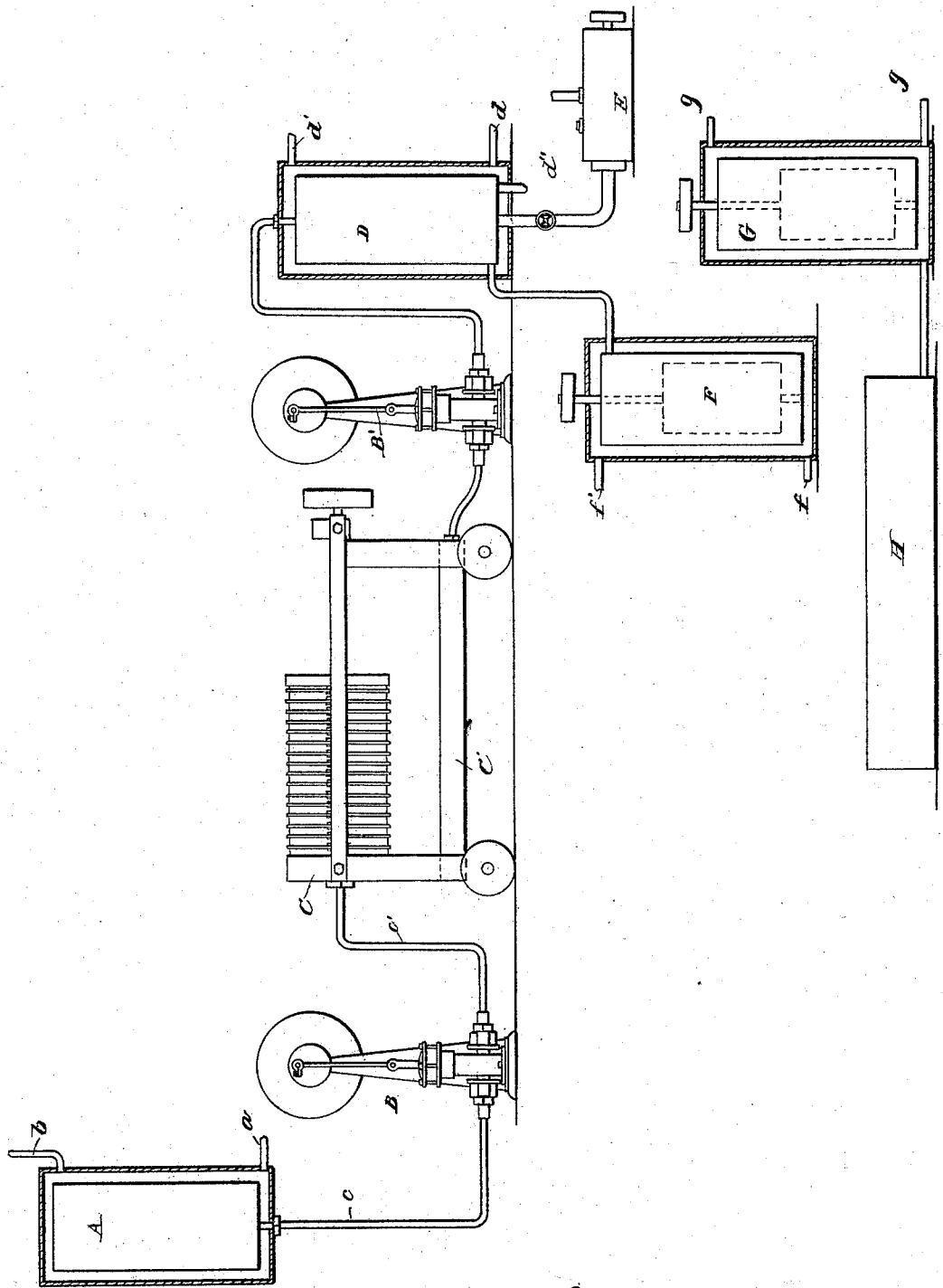

UNITED STATES PATENT OFFICE.

JAMES H. STEBBINS, JR., OF NEW YORK, N. Y., ASSIGNOR TO JOSEPH H. CAMPBELL AND CHARLES H. CAMPBELL, OF SAME PLACE.

PROCESS OF TREATING BUTTER.

SPECIFICATION forming part of Letters Patent No. 505,137, dated September 19, 1893.

Application filed September 27, 1892. Serial No. 447,022. (No specimens.)

*To all whom it may concern:*

Be it known that I, JAMES H. STEBBINS, Jr., a citizen of the United States, residing at New York city, in the county and State of New York, have invented a certain new and useful Improved Process of Treating Butter, of which the following is a specification.

This invention relates to a process whereby butter made by any of the ordinary processes and whether rancid or sweet is made to yield a uniform product improved in the qualities of purity and sweetness, which qualities will be retained for a much longer period of time than they are retained by butter manufactured by the ordinary or usual methods.

In carrying out my improved process I remove from the butter to be treated, preferably by mechanical means, the curd, salt and other solid impurities so as to obtain butter oil freed, as far as possible, from such matters. In thus treating the butter I find that by forcing it through a filter press, preferably after reduction to a liquid state by heat, the desired result is accomplished. The butter oil thus obtained will be usually found to contain ingredients of an acid and offensive nature. These ingredients are removed by treatment with an air blast and an alkaline solution. The preferable method is to treat the butter oil with the air blast in the presence of the alkaline solution, but the air blast alone serves to produce a notable removal of the undesirable ingredients and may be used alone or with the alkali treatment to follow if a complete removal is not effected. The butter oil during this treatment preferably is maintained in a liquid state at a uniform temperature. The treatment with the air and alkaline solution should continue until a tasteless oil is obtained, which can be ascertained by testing it from time to time. When the test reveals a tasteless oil, the alkaline water and oil are separated, and then the oil is treated substantially as hereinafter set forth.

In the accompanying drawings forming part of this specification I have illustrated diagrammatically an apparatus useful for carrying out my invention.

A is a tank into which the butter to be treated is introduced. This tank is jacketed as shown and provided with an inlet $a$ and overflow $b$, whereby a circulation of hot water may be maintained in the jacket thereof, suitable controlling cocks of course being employed. It is desirable to maintain the temperature of this tank somewhere near 122° Fahrenheit; over 122° Fahrenheit will frequently prove harmful.

B is a pump, which may be driven by any suitable power and which serves to convey the melted butter through the pipes $c, c'$ to a filter press C. This filter press may be of any usual or well known construction. I have found the filter press known as the Johnson filter to answer the purpose. A tray C' serves to receive the filtered product, the solid impurities such as curd and salt having been removed by the filtering operation. The oil in the tray C', however, usually retains certain objectionable properties. From the tray C' the oil is pumped by a pump B' into a tank D, which is jacketed as shown and provided with an inlet $d$ and overflow $d'$, whereby the contents of the tank may be maintained at a suitable temperature by a circulation through its jacket of hot water, steam or other heating medium. In use this tank should be provided with a cover.

E is an air blower. I have found the blower known as the Root blower useful in carrying out my process. The discharge of this blower is connected to the bottom of the tank D, whereby the contents thereof are subjected to the action of a continuous blast of air, the cover of the tank being in place while the blower is in operation, thereby preventing the contents from overflowing and scattering. Into the tank D, with the charge of oil to be treated, there is also preferably introduced an alkaline solution composed preferably of hot water in weight about five times that of the oil, and of sodium bi-carbonate about two per cent. in weight of the oil. With this alkaline solution in the tank, the combined action of the blower and alkaline solution is to rapidly oxygenate and neutralize the objectionable gases contained in the butter oil. I have found that a period of about thirty minutes is usually sufficient to insure the thorough action of the alkaline solution and to furnish sufficient oxygen to produce the desired effects. The blower then being shut off, the mixture in the tank is allowed to stand for a sufficient period of time to permit the globules of oil to rise to the surface of the water and coalesce. When this occurs, the impure water is drawn from the tank D at $d^2$. The residue is then preferably washed in a quantity of pure, clean water, free from chemicals, in amount about five times the weight of oil. This washing is preferably carried on by heating the mixture again to about 122° Fahrenheit and turning the blower on for a period of about thirty minutes. The washing operation completed, the blower is turned off and the mixture allowed to rest until the oil rises to the surface of the water, when the water is drawn off. If the oil has any taint, or rather if it is not tasteless, the washing operation is repeated until an absolutely pure butter oil, free from taint or offensive odor, is obtained.

When a tasteless and odorless oil is obtained, it is allowed to cool gradually and is treated as follows: that is to say, it is introduced into a churn F, which is provided with a circulating system for hot or cold water as the season may require, $f$ being the inlet and $f'$ the overflow, with about twenty per cent. of its weight of sour milk or sour cream and agitated for about fifteen minutes at a temperature of about 80° Fahrenheit, whereby it is brought to a plastic condition and a desirable butter aroma obtained. This plastic material is then placed in a churn G, and to it is added twice its weight of sour milk which has been previously churned. Twenty minutes' churning will usually suffice to produce a solid mass of butter, from which the sour milk and water is to be drained. The butter is then melted, a temperature not exceeding 140° Fahrenheit being maintained, and the mass constantly stirred. This melting may take place in the churn G, said churn being provided with a jacket, an inlet $g$ and overflow $g'$ as shown. The melted product is then run gradually into an ice cold water bath in the tank H, and is allowed to remain therein for a considerable period of time. The butter thus obtained is removed onto a table and allowed to drain, when it may be worked or treated in the same manner as is practiced in ordinary creameries, the period of draining depending upon varying conditions; usually twenty-four to forty-eight hours will effect draining to the desired extent.

What I claim as my invention is—

1. The process of improving butter which consists in removing the solid impurities therefrom and treating the residue with an air blast in an alkaline solution, substantially as set forth.

2. The process of improving butter which consists in removing the solid impurities therefrom and treating the residue with an air blast, an alkaline solution, and then washing in pure water aided by an air blast, substantially as set forth.

3. The process of improving butter which consists in removing the solid impurities therefrom and treating the residue with an air blast, an alkaline solution, and then washing in pure water aided by an air blast, maintaining the mixture in a liquid state by heat during the operation, substantially as set forth.

4. The process of improving butter which consists in removing the solid impurities therefrom by filtering, removing the soluble impurities therefrom by oxygenating and neutralizing the same, then treating the residue with sour milk or cream at a temperature to yield a plastic mass, then melting the mass and cooling it by an ice cold bath, substantially as set forth.

This specification signed and witnessed this 10th day of September, 1892.

JAMES H. STEBBINS, JR.

Witnesses:
D. II. DRISCOLL,
I. H. CAMPBELL.